Feb. 10, 1959 — W. E. SCHOCK — 2,873,148
AUTOMATIC BRAKING DEVICE
Filed July 2, 1956 — 2 Sheets-Sheet 1

INVENTOR.
WALTER E. SCHOCK
BY
William J. Hickey
ATTORNEY

United States Patent Office 2,873,148
Patented Feb. 10, 1959

2,873,148
AUTOMATIC BRAKING DEVICE

Walter E. Schock, South Bend, Ind., assignor to Bendix Aviation Corporation, South Bend, Ind., a corporation of Delaware Application July 2, 1956, Serial No. 595,193

9 Claims. (Cl. 303—63)

The present invention relates to pneumatic actuating systems generally; and more particularly to pneumatic power operated automotive braking systems and the like.

An object of the present invention is the provision of a new and improved automotive braking system of the type utilizing pneumatic pressures of differing intensities to actuate its brakes, and in which means are provided to automatically give an emergency application of the vehicle brakes upon a failure of one of the pressure supplies—said automatic application varying in intensity in a manner generally proportional to the degree of failure of the pressure supply.

A further object of the invention is the provision of a new and improved automotive braking system of the above described type in which means are provided to override the automatic application of the brakes and manually control the degree of braking to be achieved thereafter.

A still further object of the invention is the provision of a new and improved automotive braking system of the type which is power actuated by means of a pressure supply whose intensity fluctuates, the improvement comprising: means trapping off the maximum intensity of said fluctuable pressure supply as an auxiliary source, and means automatically isolating the normally used control valve and communicating the auxiliary source to one side of a fluid pressure motor while communicating the normal supply to the other side of the fluid pressure motor to automatically apply the brakes of the vehicle with an intensity which corresponds generally to the degree of failure of the normal pressure supply.

Figure 1:
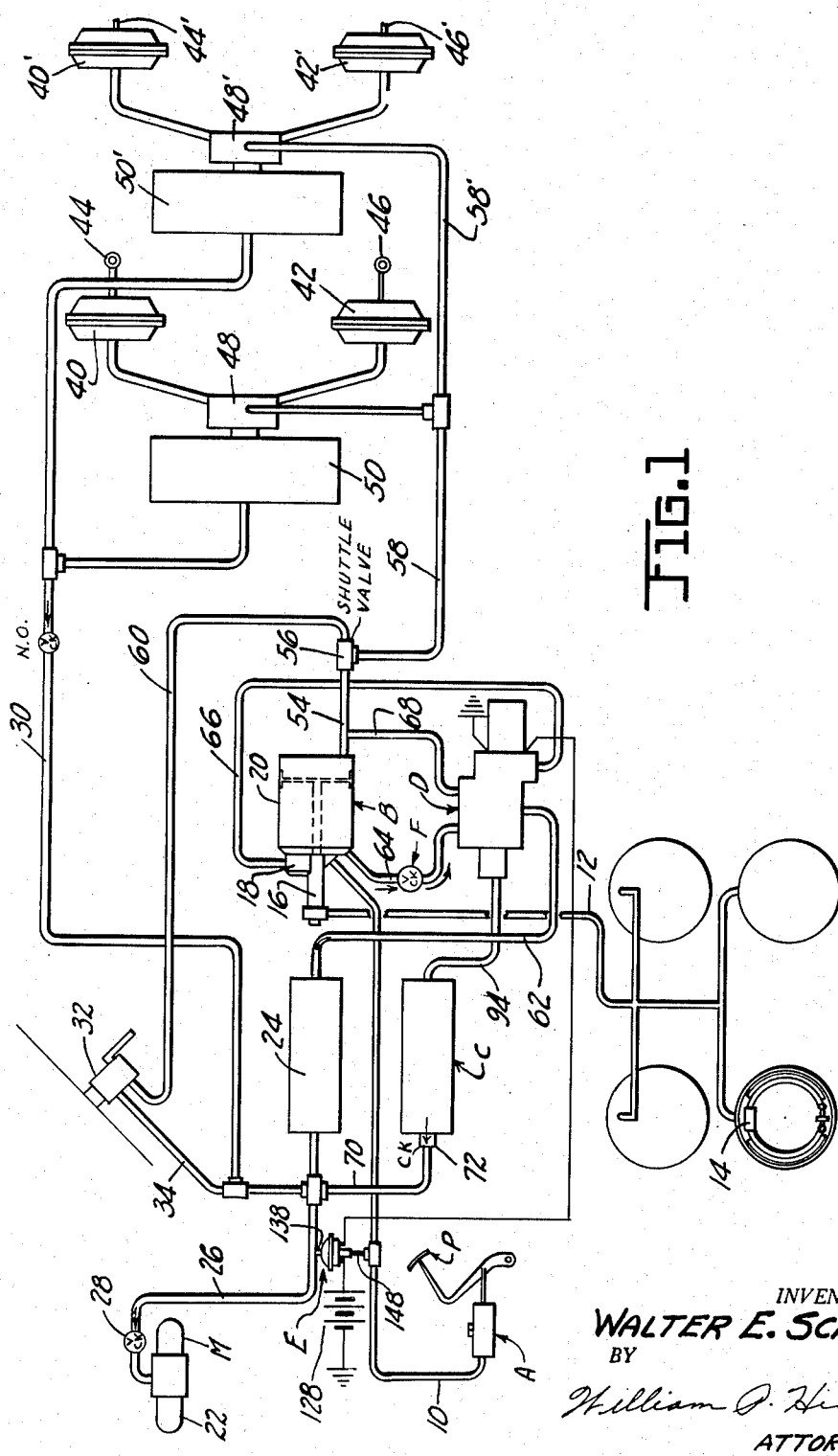
Figure 2:
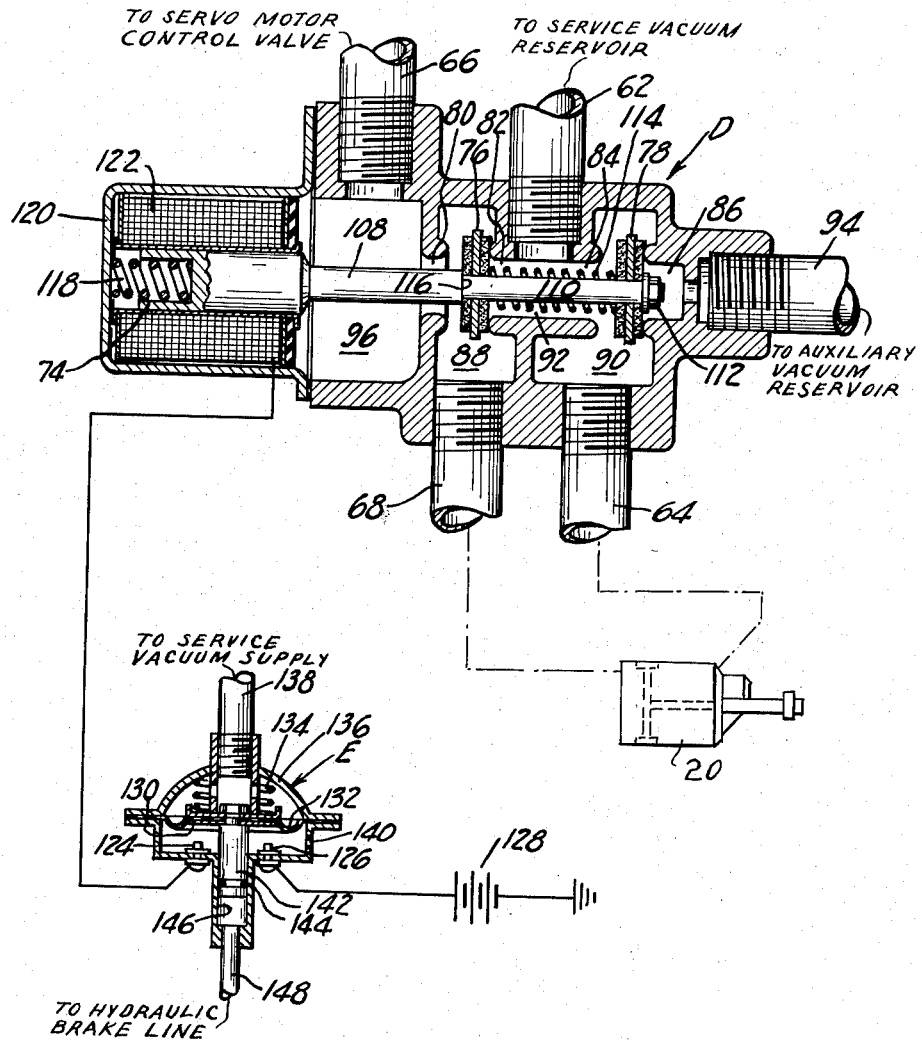

Further objects and advantages of the present invention will become apparent to those skilled in the art to which the invention relates from the following description of the preferred embodiment described with reference to the accompanying drawings forming a part of this specification, and in which:

Figure 1 is a schematic drawing of a pneumatically power actuated braking system of a tractor trailer combination automotive vehicle embodying principles of the present invention; and Figure 2 is a cross sectional view of some of the parts shown in Figure 1.

The braking system shown in Figure 1 generally comprises a foot pedal lever operated master cylinder A, the hydraulic output of which is communicated through line 10 to a pneumatic fluid pressure servo-motor B of well known construction; and thence through the hydraulic output line 12 to the wheel cylinders 14 of the tractor portion of the tractor-trailer truck. The hydraulic cylinder portion 16 of the servo-motor B is of the type containing a check valved passage in its power piston, which passage permits pressure from the master cylinder A to be communicated directly to the tractor wheel cylinders 14 when the servo-motor B is not power actuated. The servo-motor B is also provided with internal passages which communicate the hydraulic input signal from the line 10 to a hydraulically actuated pneumatic control valve 18 integrally mounted on the unit. The control valve 18 regulates the flow of vacuum to the back side (right side as seen in Figure 1) of the power cylinder 20 of the servo-motor B and thereby causes the hydraulic output pressure of line 12 to be intensified by an amount approximately directly proportional to the intensity of the input signal of line 10. For a more complete understanding of the construction and operation of the servo-motor B shown in the drawings, reference may be had to Patent 2,719,609 issued to Earl R. Price.

The braking system shown in Figure 1 is adapted to be power actuated by vacuum from the manifold M of the motor of the tractor. Vacuum from the engine manifold is conducted to a service vacuum reservoir 24 (adapted to smooth out pulsations in the system) through line 26 and check valve 28. Check valve 28 is so positioned in the system as to prevent pressure backflow from the manifold 22 from reaching the service reservoir 24 during times when the manifold vacuum is reduced by excessive opening of the butterfly valve in the carburetor of the truck's engine. Service vacuum from line 26 is also communicated to the trailer portion of the truck by the trailer service line 30; and to the hand control valve 32 through line 34.

The trailer braking system shown in the drawing is a vacuum suspended system for a dual axle trailer in which identical braking units are installed on each trailer axle, and only one of which units will therefore be described. The corresponding braking parts for each trailer axle are designated by like reference numerals with the braking parts for the rear trailer axle being further characterized in that a prime mark is affixed thereto.

The trailer brakes are actuated by normally atmospheric submerged fluid pressure motors (commonly called dishpans) 40 and 42—one for each wheel of the axle. The dishpans 40 and 42 comprise an internal diaphragm (not shown) connected to pull rods 44 and 46, respectively, which activate the axles' brakes. Actuation of the dishpans 40 and 42 is controlled by a conversion valve 48 adapted to communicate vacuum to the front side of the diaphragms. The vacuum supply system for the conversion valve 48 is normally supplied from a reservoir 50 adjacent the conversion valve in order to prevent excessive pressure loss through long lengths of the interconnecting supply line 30, and to insure quick and adequate response to the conversion valve's input signal. The input or control signal for the conversion valve 48 is normally supplied by the control valve 18 of the servo-motor B through line 54, shuttle valve 56 and trailer control line 58. The control input signal may alternately be supplied by the hand control valve 32, or may be initiated by operation of the servo-motor B as above described and intensified by operation of the hand control valve 32 through control line 60.

As previously indicated the brake actuating system is a vacuum suspended system. In such an arrangement, vacuum of equal intensity is normally supplied to opposite sides of the power piston of the servo-motor B; and vacuum of equal intensity is provided in both the trailer control line 58 and the trailer service vacuum line 30 through normally open hand control valve 32. Conversion valve 48 is so constructed that pressure build up (as caused by a predetermined loss in vacuum) in the normally vacuum submerged trailer control line 58 actuates the valve to communicate vacuum from the reservoir 50 with the dishpans 40 and 42, thereby actuating the trailer brakes. Such a vacuum suspended braking system has the advantage that a rupture of the control lines automatically applies the trailer brakes.

Vacuum from the service vacuum reservoir 24 is normally communicated to the front side of the power piston of the servo-motor; and control pressure from the control valve 18 of the servo-motor is normally communicated to the back side of the power piston, through the valve means D which will later be described. Actuation of the system above described is normally brought about by depressing of the brake pedal P, whereupon hydraulic pressure from master cylinder A operates the control valve 18 of the servo-motor to admit pressure to the back side of power cylinder 20 through lines 66 and 68. Control pressure from line 68 is also communicated to the trailer control system through line 54 and shuttle valve 56 to actuate the conversion valve 48 and dump vacuum from the reservoir 50 onto the dispans 40 and 42. Shuttle valve 56 is a two way check valve of known construction (see Patent 2,719,609 above referred to) adapted to communicate either line 54 or line 60 with the trailer control line 58 depending upon which of the lines 54 or 60 are supplied with the greater pressure. If the operator so desires, he may operate the hand control valve 32 to increase the control pressure in line 60 above that being supplied by the control valve 18 to shift the valve mechanism in the shuttle valve 56 and thereby increase the control pressure in the trailer control line 58. If one of the control lines in the braking system should become ruptured, atmospheric pressure will rush into the servo-motor B and/or conversion valve 48 to automatically apply the brakes of the vehicle.

The conversion valve 48 of the system above described is actuated by means of differential pressure between the service vacuum line 30 and the trailer control line 58. For a more complete understanding of the construction and operation of conversion valves of this type, reference may be had to Patent 2,719,609. It is a drawback of such systems that minor leaks in the control side of the system will be communicated to the vacuum supply side, or vice versa, through the control valve 18 or the hand control valve 32, such that both the service lines and the control lines become balanced at approximately the same pressure. The conversion valve 48 is, therefore, not automatically applied by leaks of this nature, and the braking effort of which the system is capable is cut down proportionately to the vacuum loss of the system.

According to the principles of the present invention there is provided an auxiliary reservoir C, control valve means D, and sensing means E, which when the service vacuum bleeds down to a predetermined point, automatically actuates the braking system by the pressure differential then existing between the auxiliary reservoir C and the service vacuum supply. This procedure automatically provides an application of the vehicle brakes, the intensity of which application is generally proportional to the vacuum loss in the brake's normal actuating system. The reservoir C is supplied with vacuum from the vacuum service line 26, through line 70, and check valve 72. Check valve 72 is so arranged to prevent pressure backflow from line 70 into the auxiliary reservoir C.

The control valve means D shown in the drawing generally comprises a four ported, solenoid operated valve whose armature 74 is provided with a pair of valve closure members 76 and 78 each of which is positioned between a pair of said valve ports and is movable to alternately close off one of its cooperating pair of ports. The valve closure members 76 and 78 are positioned in axially aligned valve chambers 88 and 90, respectively, which are respectively communicated to the front and rear sides of the servo-motor B by means of lines 64 and 68, respectively. Vacuum from the service vacuum reservoir 24 is communicated by means of line 62 to a service vacuum chamber 92 positioned between the valve chambers 88 and 90 and communicating with the valve's two center valve ports 82 and 84. Vacuum from the auxiliary reservoir C is communicated to the end valve port 86 by means of auxiliary vacuum line 94. Control pressure from the control valve 18 of the servo-motor is communicated to the other end port 80 by means of line 66 and valve chamber 96.

The armature 74 is provided with a valve stem 108 extending through valve chambers 96, 88, 92 and into chamber 90; and the valve closure members 76 and 78 are mounted upon a reduced diameter section 110 of the stem in such manner as to both slidingly and sealingly engage the stem. The valve closure members 76 and 78 are retained upon the reduced diameter section 110 by means of a washer and lock nut arrangement 112, and a coil spring 114 is positioned between the valve closure members to urge the valve closure members respectively against the shoulder 116 formed by the reduced diameter section and the retaining washer and lock nut assembly 112. By this expedient the valve closure members can automatically adjust themselves to the spacing of the valve seats for ports 82 and 86 and to the spacing between the valve seats for ports 80 and 84, to assure that each closure member will firmly abut its cooperating valve seat. A coil spring 118 is positioned between the armature 74 and the solenoid enclosure 120 to bias the valve closure members 76 and 78 into firm engagement with the valve seats for ports 82 and 86, respectively. Upon energizing of the solenoid 122, the armature 74 will be drawn to the left as seen in the drawings compressing spring 118 and moving the valve closure members 76 and 78 into firm engagement with the valve seats for ports 80 and 84, respectively.

Operation of the solenoid 122 is controlled by means of switch mechanism E having electrical contacts 124 and 126 arranged in an electrical series circuit with the solenoid 122 and the tractor's battery 128. The pole piece 130 of the switch is attached to the bottom side of a diaphragm 132; and the pole piece is biased downwardly toward the contacts 124 and 126, by a coil spring 134 positioned between the top side of the diaphragm 132 and a vacuum tight cover plate 136. Vacuum from the service vacuum line 26 is communicated to the top side of the diaphragm 132 by means of line 138 and atmospheric pressure is admitted to the bottom side of the diaphragm 132 by means of an opening 140 in the switch casing. Spring 134 is so constructed and proportioned that the differential between normal service vacuum and atmospheric pressure is sufficient to hold the diaphragm 132 upwardly, compressing spring 134, and holding the pole piece 130 out of engagement with the electrical contacts 124 and 126. When the service vacuum in line 138 decreases to a certain level (say fifteen inches of mercury vacuum), coil spring 134 is sufficient to overcome the remaining pressure differential across the diaphragm 132 to force the pole piece 130 into engagement with the electrical contacts 124 and 126. Solenoid 122 is thereupon energized, and the valve means D actuated to cause an emergency application of the brakes.

During normal operation of the braking system, service vacuum from the service vacuum reservoir 24 is communicated to the front side of the servo-motor B by lines 62, valve chamber 90 and line 64 at the same time that control pressure from the servo-motor control valve 18 is communicated to the back side of the servo-motor B by means of line 66, valve chamber 96, valve chamber 88 and control line 68. As previously described, the braking system is a vacuum submerged system such that the vacuum in lines 64 and 68 will normally be of the same intensity, and there will therefore be no pressure differential across the power piston of the servo-motor. When the normal service vacuum decreases to a predetermined level, however (say fifteen inches of mercury vacuum) the pole bar 130 of the switch mechanism E will make with respect to its contacts 124 and 126, thereby energizing the solenoid 122—whereupon, valve closure members 76 and 78 will immediately close valve ports 80 and 84, respectively, to provide an automatic application of the vehicle brakes. Under this emergency condition, service vacuum from line 62 will no longer be communicated with the line 64 leading to the front side of the power cylinder 20, and in its place auxiliary vacuum from the reservoir C will be supplied through line 94. At the same time, control pressure from the servo-motor control valve 18 will be isolated from the back side of the power cylinder 20, and in its place service vacuum will be supplied by means of line 62, valve port 82 and control line 68. It will therefore be seen, that under emergency conditions, valve means D supplies auxiliary vacuum to the front side and service vacuum to the back side of the power cylinder 20 to provide an emergency application of the vehicle brakes which will be at a degree generally proportional to the degree of failure experienced in the vehicle's normal vacuum supply.

The emergency application thus far described is completely automatic and outside of the control of the operator. According to another provision of the present invention, means are provided which enable the operator to override the automatic application provided by the control valve means D to increase the intensity of the vehicle brake application. The embodiment shown in the drawing accomplishes this result by means of a hydraulic piston arrangement attached to the under side of the diaphragm 130; and a check valve F positioned in the vacuum line leading to the front side of the power piston of the servo-motor B. Check valve F is so constructed as to prevent pressure backflow from the control means D into the front chamber of the servo-motor. The piston and cylinder arrangement provided in the switch mechanism E comprises a piston 142 attached to the diaphragm 130 and equipped with an O-ring 144 providing sealing engagement with the side walls of a cylinder bore 146. Hydraulic pressure from the line 10 is communicated to the bottom side of the cylinder bore 146 by means of line 148.

Overriding of an automatic application is accomplished by depressing the foot pedal lever P, whereupon hydraulic output pressure from the master cylinder A causes the pole piece 130 of the switch means E to move out of engagement with contacts 124 and 126 and thereby deenergize the solenoid 122. The movable valve closure members 76 and 78 in the control valve D thereupon snap back into their normal position closing off valve ports 82 and 86, respectively, to communicate line 62 with line 64, and line 66 with line 68. Since check valve F is provided in line 64, auxiliary vacuum from the reservoir C will remain in the front side of the power piston 20, while output pressure from control valve 18 is communicated to the back side of the power cylinder 20. By applying suitable foot pedal braking effort, the pressure in the back side of the power cylinder 20 may be modulated anywhere between the normal service vacuum pressure and full atmospheric pressure, thereby permitting the operator to increase the vehicle brake application if he so desires.

It will be apparent that the objects heretofore enumerated as well as others have been achieved. While the preferred embodiment of the invention has been described in considerable detail I do not wish to be limited to the particular construction shown, which may be varied within the scope of the invention, and it is the intention to cover hereby all adaptations, modifications and arrangements thereof which come within the practice of those skilled in the art to which the invention relates.

I claim:

1. In an automotive braking system and the like powered by fluid pressure differential: a brake; a brake actuating fluid pressure motor having opposed chambers into which pressures of different intensity are admitted to apply the brake; a first source of pressure; a second source of pressure, said second source normally differing from said first source but being variable to approach the pressure of said first source; an auxiliary supply of said second pressure; and control means which in its deactivated condition supplies said second pressure to both opposing chambers, which in its actuated condition supplies said first pressure to one of said opposing chambers and said second pressure to the other of said opposing chambers to actuate the fluid pressure motor, and which when the pressure differential between said first and second pressures falls below a predetermined level automatically communicates said second pressure to said one of said opposing chambers and said auxiliary pressure to said other of said opposing chambers to apply the brake by an amount generally inversely proportional to the pressure differential between said first and second sources.

2. In an automotive braking system and the like powered by fluid pressure differential: a brake; a brake actuating fluid pressure motor having opposed chambers into which pressures of different intensity are admitted to apply the brake; a first source of pressure; a second source of pressure, said second source normally differing from said first source but being variable to approach the pressure of said first source; an auxiliary supply of said second pressure; control means which in its deactivated condition supplies said second pressure to both opposing chambers, which in its actuated condition supplies said first pressure to one of said opposing chambers and said second pressure to the other of said opposing chambers to actuate the fluid pressure motor, and which when the pressure differential between said first and second pressures falls below a predetermined level automatically communicates said second pressure to said one of said opposing chambers and said auxiliary pressure to said other of said opposing chambers to apply the brake by an amount generally inversely proportional to the pressure differential between said first and second sources; and manually operated control means for overriding said automatic application by thereafter communicating said first source of pressure to said one of said opposing chambers to increase the force developed by said fluid pressure motor upon said brake.

3. In an automotive braking system powered by pressure differential between the atmosphere and a pressure differing from atmospheric pressure: a brake; a brake applying fluid pressure motor having opposed chambers into one of which atmosphere is normally admitted and into the other of which the differing pressure is normally admitted to actuate the brake; a normal supply of said differing pressure; an auxiliary supply of said differing pressure; and means automatically communicating said normal supply of said differing pressure to said one opposed chamber and said auxiliary supply to said other opposed chamber to automatically provide a partial application of the brake when the pressure differential between the normal supply and atmosphere decreases below a predetermined level.

4. In an automotive braking system powered by pressure differential between the atmosphere and a fluctuable pressure differing from atmospheric pressure: a brake; a brake applying fluid pressure motor having opposed chambers into one of which atmosphere is normally admitted and into the other of which the differing pressure is normally admitted to actuate the brake; a normal supply of said differing but fluctuable pressure; an auxiliary reservoir connected to said normal supply; means isolating said reservoir from said fluctuable supply when the pressure differential between said reservoir and atmosphere is greater than that between said supply and atmosphere; and means automatically communicating said normal supply of said differing pressure to said one opposed chamber and said reservoir to said other opposed chamber to automatically provide a partial application of the brake when the pressure differential between the normal supply and atmosphere decreases below a predetermined level.

5. In an automotive braking system powered by pressure differential between the atmosphere and a fluctuable pressure differing from atmospheric pressure: a brake; a brake applying fluid pressure motor having opposed chambers into one of which atmosphere is normally admitted and into the other of which the differing pressure is normally admitted to actuate the brake; a normal supply of said differing but fluctuable pressure; an auxiliary reservoir connected to said normal supply; means isolating said reservoir from said fluctuable supply when the pressure differential between said reservoir and atmosphere is greater than that between said supply and atmosphere; means automatically communicating said normal supply of said differing pressure to said one opposed chamber and said reservoir to said other opposed chamber to automatically provide a partial application of the brake when the pressure differential between the normal supply and atmosphere decreases below a predetermined level; and manually operated control means for overriding said automatic application by communicating the atmosphere to said one opposed chamber and said reservoir to said other opposed chamber to increase the braking effort.

6. In an automotive braking system powered by pressure differential between the atmosphere and a fluctuable vacuum supply: a brake; a brake applying fluid pressure motor having opposed chambers into one of which atmosphere is normally admitted and into the other of which the vacuum supply is normally admitted to actuate the brake; a normal supply of said fluctuable vacuum; an auxiliary reservoir connected to said vacuum supply; means isolating said reservoir from said fluctuable vacuum supply when the pressure differential between said reservoir and atmosphere is greater than that between said supply and atmosphere; means automatically communicating said vacuum supply to said one opposed chamber and said reservoir to said other opposed chamber to automatically provide a partial application of the brake when the pressure differential between said vacuum supply and atmosphere decreases below a predetermined level; and manually operated control means for overriding said automatic application by communicating the atmosphere to said one opposed chamber and said reservoir to said other opposed chamber to increase the braking effort.

7. In an automotive braking system and the like powered by fluid pressure differential: a brake; a brake actuating fluid pressure motor having opposed chambers into which pressures of different intensity are admitted to apply the brake; a first source of pressure; a second source of pressure, said second source normally differing from said first source but being variable to approach the pressure of said first source; an auxiliary supply of said second pressure; a control valve for regulating pressure in one of said opposing chambers of said fluid pressure motor and which in a deactivated condition communicates said second pressure to said one of said opposing chambers, and which when actuated closes off said second pressure and modulates said first pressure to said one of said opposing chambers to actuate said brake; and an emergency valve interpositioned between said control valve and said fluid pressure motor, said emergency valve having a normal condition wherein it communicates said control valve with said one of said chambers and said second pressure source with the other of said chambers, and a second condition wherein it communicates said second pressure source to said one of said opposing chambers and said auxiliary supply to said other of said opposing chambers; and means which changes said emergency valve from said one condition to said second condition when the pressure differential between said first and second pressure sources decreases below a predetermined amount.

8. In an automotive braking system and the like: a brake; a pneumatic fluid pressure motor having opposed chambers into which pressures of different intensity are admitted to apply said brake; a first source of pneumatic pressure; a second source of pneumatic pressure, said second source normally differing from said first source but being variable to approach the pressure of said first source; an auxiliary supply of said second pressure; a hydraulically actuated control valve for regulating pressure for one of said opposing chambers of said fluid pressure motor, said hydraulically activated control valve communicating said second pressure with said one opposing chamber when substantially no hydraulic actuating pressure is supplied said control valve, and communicating a modulated pressure intermediate said first and second pressures to said one opposing chamber in accordance with the hydraulic actuating pressure supplied to said control valve; a hydraulic master cylinder supplying hydraulic pressure to said control valve; a valve having one motor port communicating with said one of said opposing chambers and another communicating with the other of said opposing chambers, said valve when in one condition communicating said control valve with said one motor port and said second pressure source to said other motor port, and when in a second condition communicating said second source to said one motor port and said auxiliary supply to said other motor port, means causing said valve to be in its first condition at pressure differentials between said first and second pressure sources above a predetermined amount and to be in its second condition at pressure differentials below said predetermined amount, a one way check valve between said second motor port and said other opposing chamber for holding said auxiliary supply in said other opposing chamber, and means actuated by said hydraulic master cylinder for overriding said last mentioned means to move said valve to its first condition when said hydraulic master cylinder is actuated.

9. In an automotive braking system and the like: a brake; a pneumatic fluid pressure motor having opposed chambers into which pressures of different intensity are admitted to apply said brake; a source of atmospheric pressure; a source of vacuum, said vacuum source normally differing from said first source but being variable to approach atmospheric pressure; an auxiliary supply of vacuum; a hydraulically actuated control valve for regulating pressure for one of said opposing chambers of said fluid pressure motor, said hydraulically activated control valve communicating said vacuum to said one opposing chamber when substantially no hydraulic actuating pressure is supplied said control valve, and communicating a modulated pressure intermediate said atmospheric and vacuum pressures to said one opposing chamber in accordance with the hydraulic actuating pressure supplied to said control valve; a hydraulic master cylinder supplying hydraulic pressure to said control valve; a solenoid operated valve having one motor port communicating with said one of said opposing chambers and another communicating with the other of said opposing chambers, said valve when de-energized communicating said control valve with said one motor port and said second pressure source to said other motor port, and when energized communicating said second source to said one motor port and said auxiliary supply to said other motor port, electrical switch means causing said valve to be de-energized at pressure differentials between said first and second pressure sources above a predetermined amount and to be energized at pressure differentials below said predetermined amount, a one way check valve between said second motor port and said other opposing chamber for holding said auxiliary supply in said other opposing chamber, and means actuated by said hydraulic master cylinder for overriding said last mentioned means to de-energize said solenoid valve when said hydraulic master cylinder is actuated.

References Cited in the file of this patent
UNITED STATES PATENTS

| | | |
|---|---|---|
| 1,403,290 | Catching | Jan. 10, 1922 |
| 2,656,014 | Fites | Oct. 20, 1953 |
| 2,719,609 | Price | Oct. 4, 1955 |